April 11, 1967     W. C. GATERMAN     3,313,095
GROUND SENSING CROP HARVESTING APPARATUS
Filed Jan. 22, 1964                          3 Sheets-Sheet 3
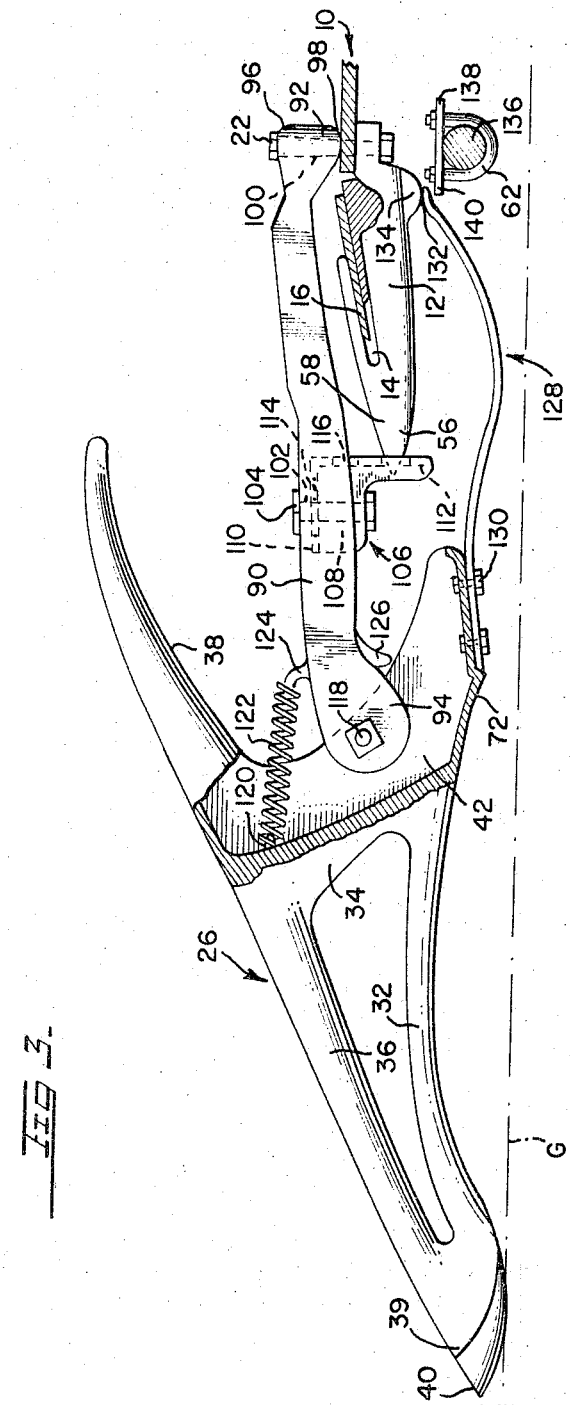
FIG. 3.
INVENTOR
WILLIAM C. GATERMAN
BY
ATTORNEY

United States Patent Office 3,313,095
Patented Apr. 11, 1967

3,313,095
GROUND SENSING CROP HARVESTING
APPARATUS
William C. Gaterman, Memorial Drive,
Manitowoc, Wis. 54220
Filed Jan. 22, 1964, Ser. No. 339,419
18 Claims. (Cl. 56—312)

This invention relates to a ground sensing crop harvesting apparatus.

More particularly, the present invention pertains to crop harvesting machinery comprising ground sensing apparatus responsive to generally vertical irregularities in the ground for automatically vertically variably positioning the sickle bar foundation assembly of a conventional harvesting machine to conform to generally abrupt substantially vertical differentiations in ground contour and enabling the automatic compensation therefor while yet maintaining optimum efficiency in the harvesting of crops.

It is a primary object of the present invention to provide ground sensing apparatus that is particularly adapted to be structurally operatively associated with or connected to the sickle bar foundation assembly of crop harvesting machinery, said apparatus being so constituted and arranged as to automatically vertically variably position the assembly to compensate for and conform with generally abrupt substantially vertical differentiations in ground contour.

Another primary object of this invention is to provide ground sensing apparatus particularly adapted to be structurally operatively associated with or connected to the sickle bar foundation assembly of crop harvesting machinery, said apparatus being so constituted and arranged as to be particularly adapted to the proper separation, disposition and distribution of crops positioned close to the ground and being particularly adapted to automatically vertically variably position the assembly to compensate for and conform with generally abrupt substantially vertical differentiations in ground contour.

It is a further primary object of the present invention to provide ground sensing apparatus particularly adapted to be structurally operatively associated with or connected to the sickle bar foundation assembly of crop harvesting machinery, said apparatus being disposed in advance of said assembly and being so constituted and arranged as to be particularly adapted to the proper separation, disposition and distribution of crops lying close to the ground while simultaneously automatically sensing generally abrupt substantially vertical variations or irregularities in the ground and substantially immediately subsequent thereto vertically variably positioning said assembly to compensate for and conform with said irregularities.

Yet another primary object of this invention is to provide ground sensing apparatus particularly adapted to be structurally operatively associated with or connected to the sickle bar foundation assembly of crop harvesting machinery, said apparatus being disposed in advance of said assembly and being so constituted and arranged as to properly separate, dispose and distribute crops lying close to the ground while simultaneously automatically sensing generally abrupt substantially vertical variations or irregularities in the ground and substantially immediately subsequent thereto actuating automatically operable control means for vertically variably positioning and for controlling the vertical position of said assembly to compensate for and conform with said irregularities.

A still further object of the present invention is to provide ground sensing apparatus particularly adapted to be structurally operatively associated with or connected to the sickle bar foundation assembly of crop harvesting machinery, said apparatus being disposed in advance of said assembly and being so constituted and arranged as to properly separate, dispose and distribute crops lying close to the ground while simultaneously automatically sensing generally abrupt substantially vertical variations or irregularities in the ground and substantially immediately subsequent thereto actuating automatically operable control means for vertically variably positioning and for controlling the vertical position of said assembly to compensate for and conform with said irregularities, said apparatus being further so constituted and arranged as to be readily and quickly adjustable to positions corresponding with various operating conditions and to various types, kinds and makes of harvesting machinery.

Other objects and important features of the invention will be apparent from a study of the specification following taken with the drawings, which together show, illustrate, describe and disclose preferred embodiments or modifications of the invention and what is now considered to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

In the drawing:

FIGURE 3 is a view similar to FIGURE 2, but illustrating a further embodiment of a sensing apparatus constructed in accordance with the present invention; and FIGURE 4 is a detailed view illustrating a modification of the embodiment shown in FIGURE 2.

Figure 1:
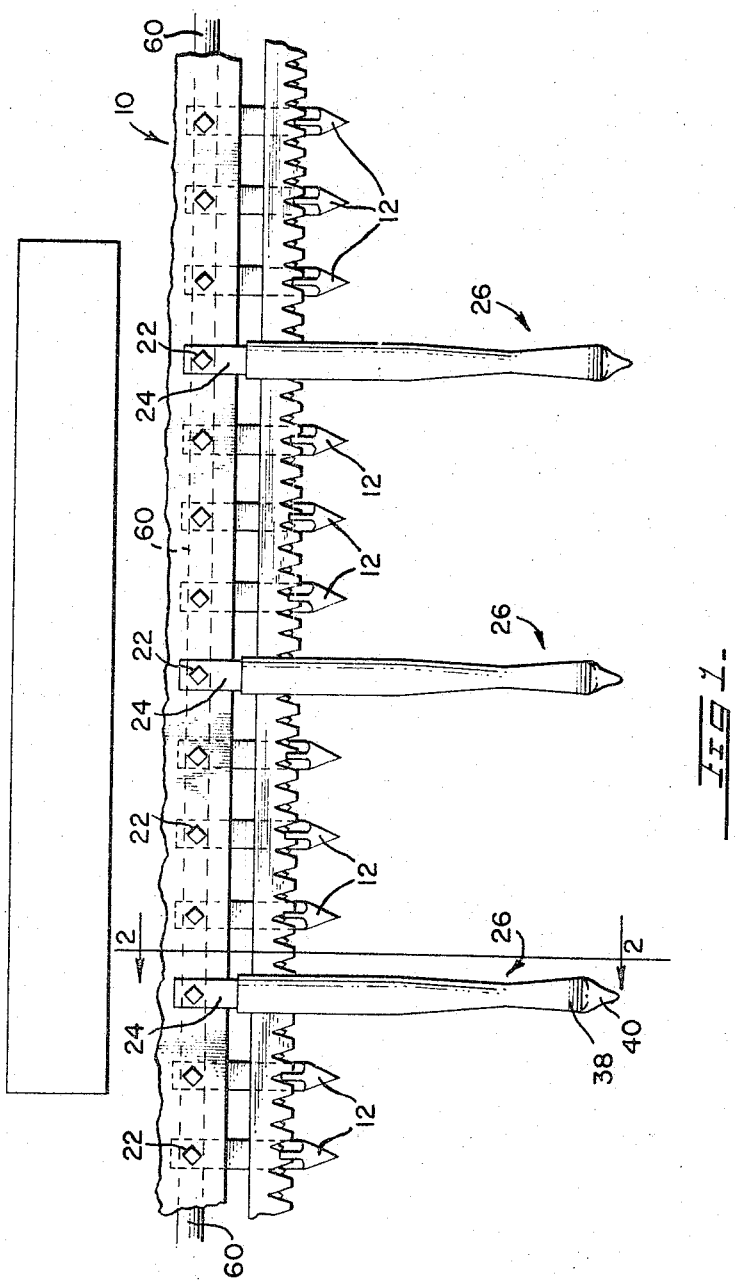
FIGURE 1 is a plan view, partially broken away, of one embodiment of a sensing apparatus constructed in accordance with the present invention, and being disposed in structural operative association with the sickle bar foundation assembly of a conventional harvesting machine.
Figure 2:
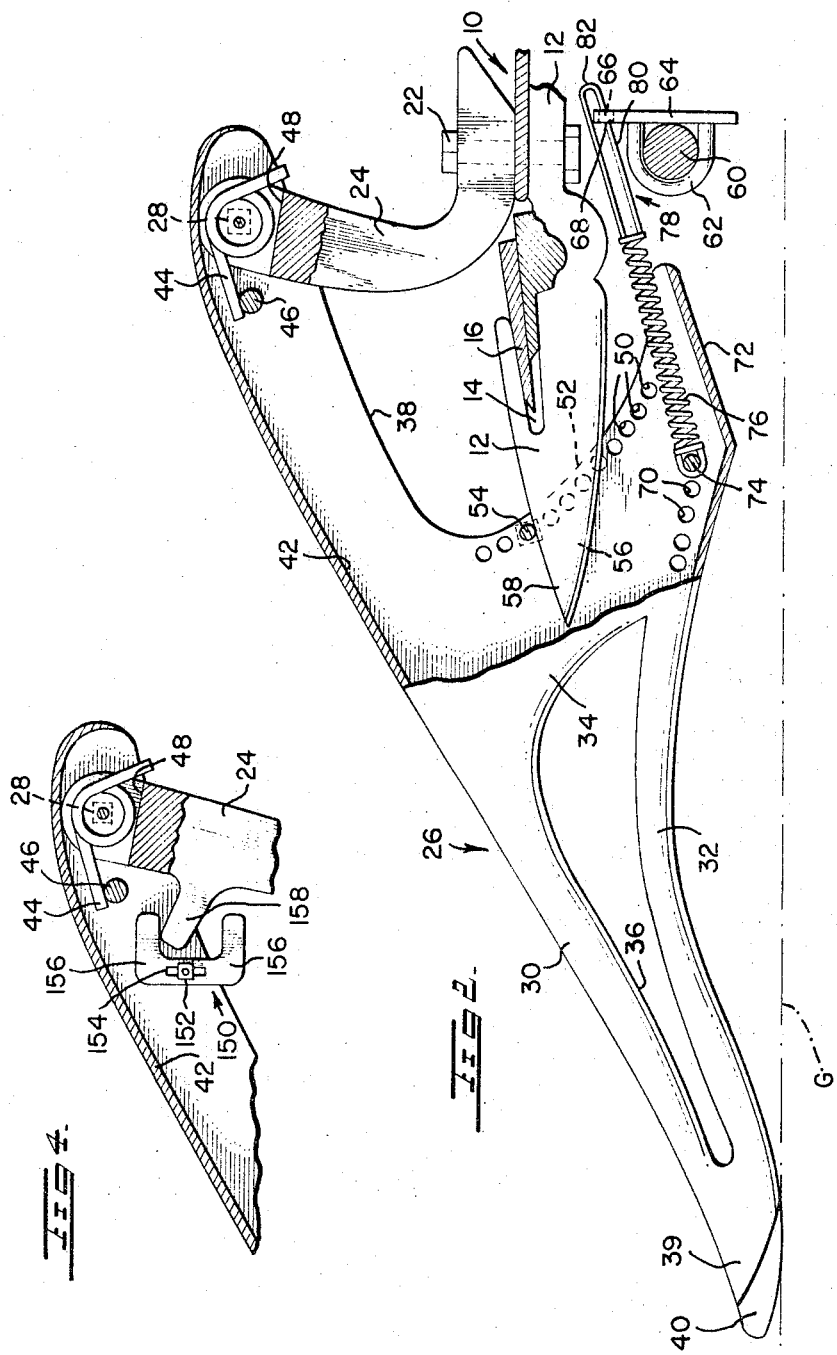
FIGURE 2 is a cross-sectional view, partially in elevation and partially in section, and taken along the line 2—2 of FIGURE 1.

Referring now to the drawings, and particularly to FIGURES 1 and 2 thereof, the sickle bar foundation assembly 10 of a conventional harvesting machine (not shown) is illustrated therein. The assembly 10 supports a sickle guard 12 comprising a channel 14 extending generally longitudinally thereof, in which channel a conventional sickle bar 16 is particularly adapted to be slidably disposed. There are a plurality of sickle guards 12 each of which may be fixed with the assembly 10 in any suitable manner, and, to this end, there is provided a plurality of conventional fasteners 22. As thus far described, the assembly 10 and the sickle guard 12 are conventional and comprise well known structure.

A plurality of curvilinearly configured bracket arms 24 are fixed with the guard 12 in any suitable manner, as by means of the fasteners 22. The arms 24 preferably are positioned at locations substantially adjacent any one or more of the stakes 18, and are each of them preferably of substantially the same dimensional extent.

Each of the bracket arms 24 comprises means particularly adapted to pivotally structurally associate a finger 26 with respect to the assembly 10, each of which fingers, as will be described hereinafter, comprises a means for properly separating, disposing and distributing crops lying close to the ground and simultaneously automatically sensing generally abrupt substantially vertical variations or irregularities therein. To this end, each of the fingers 26 is pivotally connected with a corresponding one of the arms 24, in any suitable manner, as by means of a carriage bolt 28 that is so constituted and arranged as to enable pivotable movement therebetween, and extends generally forwardly thereof. The number of arms 24 and fingers 26 will vary depending on the particular harvesting conditions that prevail. It is to be further understood that each finger 26 operates and functions independently and distinct from the others, but that any one or more of them are operable to achieve the desired results.

With particular reference to FIGURE 2 of the drawings, it will be seen that each of the fingers 26 comprises an upper leg 30 and a lower leg 32. The legs 30 and 32 are of minute transverse dimensional extent, or of narrow width, and of substantial longitudinal dimensional extent. Additionally, the legs are disposed in acute angular relationship with respect to one another, and are connected together by a bridging leg 34. The legs 30, 32 and 34, and the relationship therebetween, as just described, define an irregularly configured opening or aperture 36, as a result of which less material is required for fabricating the finegrs 26. The weight of each finger is accordingly maintained at a relative minimum. This result is further achieved inasmuch as the relationship between and the configuration of the legs define a recess 38 of curvilinear configuration disposed rearwardly of each of the fingers.

The legs 30, 32 and 34 of the fingers 26 define an irregularly configured triangle, at the apex of which there is disposed a shoe 39. The shoe is of greater transverse dimensional extent or width than the remainder of the finger 26, and, to this end, the finger is tapered, forwardly and outwardly as particularly illustrated in FIGURE 1. The shoe, or toe, 39 is positioned forwardly of the sickle guard 12, and is normally disposed relatively close to the ground G to preclude the finger 26 from undesirably entering or "digging" into the ground. Additionally, the shoe is so configured and arranged as to present or comprise a narrow blade or knife 40, the purpose of which is to aid the finger 26 in its function of properly separating, distributing and positioning crops lying close to the ground G for efficient severing therefrom.

As pointed out above, the legs 30 and 32 are disposed in acute angular relationship relative to one another. In addition, the bridging leg 34 extends or is directed rearwardly and downwardly of the leg 30, and is disposed generally in right angular relationship with respect thereto. The leg 32 is particularly configured to present a convexity upwardly relative to the leg 30, or a concavity downwardly relative to the ground G. To simplify the language used hereinafter, the leg 32 will be denoted as being of curvilinear configuration convexly relative to the leg 30.

Each of the fingers 26 comprises further a channel or channel housing 42 extending rearwardly thereof, and including at least the bridging leg 34 and that portion of each of the legs 30 and 32 directed or disposed rearwardly thereof. To this end, and with particular reference again to FIGURE 1, the fingers 26 are tapered rearwardly and outwardly at least partially of the length thereof. As pointed out above, the bracket arms 24 are pivotally connected with the fingers 26, and, to this end, the arms are positioned to extend to within the housing 42. The housing is provided with an aperture (not shown) through which the bolt 28 extends. While also not shown, the aperture may be of greater longitudinal dimensional extent or length than the transverse dimensional extent or width, and, additionally, may be serrated to present a longitudinally forwardly and rearwardly adjustable relationship between the fingers 26 and the sickle guard 12. Such a configuration of the aperture through which the bolt 28 extends performs the further function of firmly securing the bracket arm 24 to the finger 26, while yet providing for pivotal movement therebetween.

A biasing means 44 is disposed about the carriage bolt 28, and preferably comprises a coil spring looped thereabout. The spring 44 is particularly adapted to mutually cooperatively engage a stop 46 positioned integrally upon the leg 30 and extending inwardly into and within the channel 42. The arm 24 is provided with an abutment or stop surface 48 with which the spring 44 is also mutually cooperatively engageable. In accordance with this construction, it can be seen that the biasing means 44 yieldingly biases or thrusts the finger 26 in one of a plurality of rotational directions, namely, in a generally counter-clockwise direction towards the ground G, thus positioning the shoe 39 in close proximity thereto. While a coil spring has been illustrated and described, it is to be understood that other types of springs may be utilized. For example, a "Z" shaped spring may be used, and, for that matter, gravity may be used, since the particular construction and configuration of the fingers 26 positions the center of gravity thereof well forwardly of the connection thereof to the bracket arms 24.

A plurality of closely spaced apertures 50, of generally uniform size and configuration, extend through and are positioned along that edge of the channel housing 42, namely the rear edge, defining the recess 38. Specifically, the apertures 50 are positioned along the rear edge 52 of the bridging leg 34. A stop means or abutment 54 is particularly adapted to be selectively adjustably positioned within a selected one of the apertures 50. Such an abutment may comprise a conventional bolt. The sickle guard 12 is of tapered configuration at the forwardly disposed end 56 thereof, which forward end is particularly adapted to extend into the channel housing 42. In accordance with the above construction, the housing opens rearwardly thereof enabling entrance thereinto of the sickle guard 12, the upper surface 58 of which is particularly adapted to abuttingly engage the abutment 54. This abutting relationship of the sickle guard 12 relative to the abutment 54 is maintained by the biasing means 44. As a result of this relationship, there is provided selective adjustment in variably vertically spacing the shoe 39 of each of the fingers 26 relative to the assembly 10 and the ground G. As pointed out above, the aperture (not shown) through which the carriage bolt 28 extends provides for adjustment of the fingers 26 relative to the sickle guard 12, specifically, longitudinal adjustment therebetween, especially when the aperture is of serrated configuration. In addition, there is provided mounting means adaptable for mounting sickle guards of varying sizes. The apertures 50 and the abutment 54 conjointly, comprise means for generally arcuately vertically variably positioning said sensing means, or the fingers 26, relative to the sickle guard 12, and, accordingly, relative to the ground G.

A power control shaft 60 is positioned in underlying relationship with respect to the sickle guard 12, at a predetermined distance therebelow, and is disposed in parallel relationship relative thereto. The shaft 60 is disposed for rotation within bearings (not shown) mounted on the harvesting machinery with which the fingers 26, comprising a means for properly separating, disposing and distributing crops lying close to the ground and for subsequent severance therefrom and for simultaneously automatically sensing generally abrupt substantially vertical variations or irregularities therein, as pointed out above, and as will be more fully described hereinafter, are particularly adapted to be used. The rotatable shaft 60 is particularly adapted to actuate control means (not shown), which may comprise suitable valving means (not shown) which, in turn, is particularly adapted to control suitable power means (not shown), for example, such as a hydraulic ram or motor. In this manner, the vertical disposition of the sickle guard foundation assembly 10 relative to the ground G is capable of being varied. The particular details of the various mechanisms and component parts for varying the height of the assembly 10 relative to the ground G forms no part of the present invention. Hence, further description thereof is not deemed necessary. However, to facilitate a still further complete understanding of the present invention, reference is made to Wright, U.S. Patent No. 2,750,727, and Carruthers, U.S. Patent No. 2,913,865, each of which is illustrative of examples of mechanisms and component parts suitable for use with the present invention. A U-shaped or configured clamp or bolt 62 fixedly structurally associates a generally vertically disposed actuating lever 64 relative to the control shaft 60, which lever has an aperture 66 extending through the upper end 68 thereof. It is to be understood that while capable of variation, when the actuating lever 64 is disposed in a generally vertically extending position, as particularly illustrated in FIGURE 2, the exemplary power system, comprising the control means, the valving means and the power means, as described above, is inactive, the lever being particularly adapted to be maintained in this position by a biasing means (not shown) when permitted to do so. This exemplary power system, in conjunction with the shaft 60 and lever 64, comprises a means for linearly vertically variably positioning and for controlling the vertical position of the assembly 10 to compensate for and conform with abrupt irregularities in the ground G.

Another plurality of spaced apertures 70 extends through the channel housing 42. The apertures 70 are positioned adjacent and extend generally horizontally and extend along the lower generally rearwardly disposed wall 72 of the housing, substantially within the confines or peripheries of the bridging leg 34. A securing bolt 74, of any suitable construction, is particularly adapted to extend through a selected one of the apertures 70, about which bolt a biasing means comprising a helical coil spring 76, is particularly adapted to be adjustably fixedly and rotatably positioned. The biasing means or coil spring 76 extends generally rearwardly of the fingers 26, and, at the other end thereof, is provided with a longitudinally dimensionally extensive loop 78 having a lower rod 80 particularly adapted to extend through the aperture 66. The loop 78 comprises, in addition, a bight end 82 that is spaced generally rearwardly of the actuating lever 64 a predetermined distance, presenting a lost-motion relationship or connection therebetween, the purpose of which will be described more fully hereinafter. It can be seen, therefore, that there is additionally provided an adjustable lost-motion means for rotatably activating said actuating lever when said sensing means responds to generally abrupt substantially vertical variations in the ground.

In the operation of the abovedescribed apparatus, constructed in accordance with the present invention, it will be assumed that the control shaft 60 is structurally operatively associated with suitable control means (not shown), comprising suitable valving means (not shown), controlling suitable power means (not shown), for varying the height of the sickle guard foundation assembly 10 relative to the ground G, all as described above. The shoe or toe 39 of each of the fingers 26 is positioned initially in relatively close proximity with respect to the ground G, the same being accomplished by disposing the abutment 54 in a selected one of the apertures 50. As pointed out above, the force developed by the biasing means 44 tends to rotate each of the fingers 26 in a generally counterclockwise direction, thrusting the abutment 54 into abutting mutual cooperative engagement with the upper surface 58 of the sickle guard 12. In this manner the desired spaced relationship between each of the fingers 26 and the ground G is obtained.

The harvesting machinery upon which the fingers 26 are positioned would move in a direction generally to the left, as viewed in FIGURE 2. The narrow blades or knives 40, disposed at the toe 39 of each of the fingers, are particularly adapted to move beneath and lift any crops lying close to the ground G. In this manner, crops, such as pea vines, will be properly distributed and disposed enabling the harvesting machinery with which the fingers 26 are structurally associated to efficiently sever such low lying crops from the ground. At the same time, the shoe or toe 39 of each of the fingers 26 preclude, due to their particular widened configuration, the fingers from entering or "digging" too deeply into the ground.

As the machinery moves along the ground, any protuberance or projection extending generally vertically upwardly therefrom will be engaged by a corresponding one of the fingers 26, causing the same to rotatably move in a generally clockwise direction, that is, upwardly, against the bias of the biasing means or spring 44. As the finger 26 pivots generally clockwise about the pivot defined by the carriage bolt 28, the loop 78 will be pulled to the left, as viewed in FIGURE 2, against the bias of the biasing means or spring 76, by virtue of the latter being rotatably mounted by the securing bolt 74. If the vertical extent of the ground protuberance is gentle or small, then the lost-motion relationship between the bight end 82 of the loop 78 and the upper end 68 of the lever 64, precludes the latter from being rotated. As the finger passes the ground protuberance, the convex curvilinear configuration of the leg 32 enables the protuberance to occupy the area defined thereby and, further, enables the finger 26, under the influence of the biasing means or spring 44, to return to its initial position in close proximity relative to the ground G. The rotational movement of the finger to its initial position is, as pointed out above, limited by the predetermined relationship between the abutment 54 and the upper surface 58 of the sickle guard 12. It is to be understood that the finger 26 may be returned to such initial position by crop pressure, or even by gravity, as well as by means of the spring 44.

However, should any one or more of the fingers 26 engage a generally abrupt ground protuberance of substantial vertical extent, resulting in sufficient movement of the loop 78 both rotatably about and longitudinally of the upper end 68 of the lever 64 so that the bight end 82 thereof engages the said upper end, the lever will be rotated in a generally counter-clockwise direction, as viewed in FIGURE 2. The amount of rotational movement of the lever 64 will be proportional to the vertical extent of the protuberance and the resulting rotational movement of the finger 26. Rotation of the actuating lever will actuate the valve means (not shown) of the control means (not shown), which is turn, actuates the power means (not shown), such as an hydraulic ram. The power means will raise the sickle guard foundation assembly 10 a vertical distance corresponding substantially with the vertical distance of the protuberance. As a result, any damage to the harvesting machinery with which the fingers 26 are structurally associated is precluded. Subsequently, the protuberance is disposed within the area defined by the convex curvilinear configuration of the leg 32, enabling the finger 26 to be returned to its initial position substantially in engagement with the ground G by virtue of the force of the coil spring 44. Of course, the force of gravity on the finger 26 will also tend to return the finger to its initial position. The actuating lever 64 is then returned to its initial or inoperative position, as illustrated in FIGURE 2, by means of a return means, such as a spring (not shown). Finally, return of the lever to its initial position, disposes the power means to move generally vertically downwardly or lower and return the sickle guard formation assembly 10 to its initial position, also illustrated in FIGURE 2.

It is to be understood, at this point, that the particular lost-motion relationship between the loop 78 of each of the fingers 26 and the upper end 68 of the actuating lever 64, enables one finger to sense a protuberance and send the control means and power means through the above described sequence of operations, without in any way effecting the disposition of the other fingers relative to the ground G. Of course, more than one finger 26 can sense a protuberance at the same time, and of varying vertical extents, in which case the finger engaging the greater vertically extending protuberance will control the said sequence of operations and the extent the assembly 10 will be vertically displaced. Nevertheless, and again, the remaining fingers 26 will not be rotatably displaced due to the above described lost-motion relation.

In accordance with the above, it can therefore be seen that each of the fingers 26 comprises a means for properly separating, disposing and distributing crops lying close to the ground and for simultaneously automatically sensing generally abrupt substantially vertical variations or irregularities therein, precluding the harvesting machinery with which the means is structurally associated from being damaged, and enabling the latter to efficiently sever all crops to be severed therefrom, even those disposed in low lying relationship with respect thereto.

Crop harvesting conditions are capable of varying greatly. Some harvesting conditions require that the sensing fingers 26 be initially disposed further from the ground G than as illustrated in FIGURE 2. To increase the vertical distance or spacing between each of the fingers and the ground, it is necessary merely that the abutment 54 be removed, the finger 26 rotated in a generally clockwise direction as viewed in that figure, and the abutment replaced in an aperture 50 disposed in closer relationship relative to the spring 76. Once the abutment 54 is replaced as desired, the forward end 56 of the sickle guard 12 again extends into the channel housing 42 with the upper surface 58 thereof in abutting engagement therewith. Increasing the vertical distance between the toe 39 of each of the fingers 26 decreases the extent of lost motion between the bight end 82 of the loop 78 and the upper end 68 of the actuating lever 74, due to the rotational movement of the fingers in accomplishing this adjustment. Should the extent of lost motion be decreased beyond a desirable amount, the securing bolt 74 is selectively adjusted to one of the apertures 70 disposed closer to the loop. As a result of this selective adjustment, there is retained the function of ineffectually sensing gentle variations in ground contour, while, in response to generally abrupt variations in ground contour, the sensing fingers 26 cause rotational movement of the actuating lever 64 and the above described sequence of operations. It can be seen, therefore, that the apertures 50 and 70, in conjunction with one another, provide for an extensive range of adjustment regarding the vertical spacing of the toe 39 of the fingers 26 relative to the ground G. It is additionally to be understood that a micrometric adjustment is obtainable by varying the rotational disposition of the shaft 60 within and relative to the bolt 62 and the actuating lever 64.

With reference now to FIGURE 3 of the drawings, there is illustrated therein another embodiment of a means for properly separating, disposing and distributing crops lying close to the ground and for simultaneously automatically sensing generally abrupt substantially vertical variations or irregularities therein, and wherein like reference characters indicate like parts throughout.

In the embodiment illustrated in FIGURE 3, the arcuately vertical positioning means comprises a longitudinally dimensionally extensive supporting arm 90 structurally operatively associated at its rearwardly disposed end 92 with the sickle bar foundation assembly 10, as by means of the fasteners 22. The arm is disposed in overlying relationship with respect to the assembly 10, extending substantially forwardly of the tapered end 56 of the sickle guard 12 thereof, terminating in an enlarged annularly configured forwardly disposed end 94. The end 92 of the arm 90 is comprised of upper and lower surfaces 96 and 98, respectively, each of which is of an arcuate configuration. A bore 100 is disposed to extend through the end 92 to accommodate the fastener 22, which bore is of a radially outwardly enlarged tapered configuration from the lower end 98 generally vertically upwardly to the upper end 96, enabling pivotal movement of the arm relative to the fastener.

Approximately midway or medially of the length thereof, the arm 90 is provided with a bore 102 extending completely transversely thereof and therethrough. A conventional fastener, such as a mounting bolt 104, extends completely through the bore 102, and is particularly adapted to carry a generally right angularly configured positioning block 106 relative to the arm 90.

The arcuate positioning means comprises, further, the block 106 having a body 108, a longitudinal adjusting surface 110 and a vertical adjusting surface 112, each surface extending outwardly of the body, and being disposed generally in right angular relationship with respect to one another. The longitudinal adjusting surface 110 is provided with a plurality of spaced longitudinal adjusting apertures 114, each of which may be aligned with the bore 102. Additionally, the vertical adjusting surface 112 is provided with a plurality of spaced vertically disposed adjusting apertures 116, any one of which may receive the tapered forward end 56 of the sickle guard 12. In accordance with the construction, it can be seen that pivotal movement of the arm 90, about a transverse horizontal axis extending generally through fastener 22, as a result of the arcuately configured surfaces 96 and 98, enables the end 56 to be selectively disposed in any of the vertical adjusting apertures 116. In this manner, the initial vertical position of the fingers 26 relative to the sickle guard 12 and to the ground G can be varied. However, if the amount of pivotal movement provided for by the surfaces 96 and 98 is not sufficient to dispose the end 56 in the desired one of the apertures 116, the block 106 may be adjusted longitudinally of arm 90 by selectively positioning any one of the apertures 114 for mutual cooperative engagement with the bore 102 and the mounting bolt 104 extending therethrough. It is to be understood that the block 106 is reversible relative to the position thereof illustrated in FIGURE 3. Accordingly, the apertures 116 may be disposed for selective mutual cooperative engagement with the aperture 102 and the bolt 104, and the apertures 116 disposed for mutual cooperative engagement with the tapered end 56 of the sickle guard 12. In this manner, by spacing the apertures 114 differently than the spacing of the apertures 116, a finer adjustment of the initial height of the fingers 26 relative to the sickle guard 12 and the ground G may be obtained.

The housing 42 of the fingers 26 is provided with an aperture (not shown) extending completely generally horizontally therethrough, in which is disposed a conventional fastener 118. The enlarged arcuate forward end 94 of the arm 90 is pivotally mounted upon the fastener 118, in which manner both the arm 90 and the fingers 26 are pivoted relative to one another. The housing 42 of each of the fingers 26 is provided with a lug 120, upon which one end of a biasing means comprising a compression spring 122 is fixedly associated. The other end of the biasing means 122 is fixed with a projection 124 extending generally vertically upwardly and outwardly of the arm 90. The arm 90 additionally comprises a generally downwardly extending lug 126 that is particularly adapted to be mutually cooperatively engageable with the housing 42, in accordance with which pivotal movement of the fingers 26 about the fastener 118 and in a generally counter-clockwise direction beyond such engagement is precluded. It can be seen therefore that the compression spring 122 tends to cause the shoe 39 of the fingers to rest upon the ground G or, in the alternative, tends to position the housing 42 in engagement with the lug 126. Preferably, when the toe 39 has been adjusted to rest on the ground, a slight clearance is presented so that the toe is capable of entering into a depression in the ground before the housing mutually cooperatively engages the lug 126. As a result, the fingers more closely realize the contour of the ground G.

The lost-motion means comprises a longitudinally dimensionally extensive generally rectangular adjustable resilient arm 128, which is connected to the rearwardly disposed wall 72 of the housing 42 in any suitable manner, as by means of conventional fasteners 130. The arm may be fabricated in any suitable manner and of any suitable material, such as spring steel, enabling adjustability by bending thereof, is of generally downwardly extending curvilinear configuration, and has an end 132 disposed in underlying relationship relative to the sickle guard 12. At that location, the guard 12 is provided with a generally vertically downwardly extending projection 134, which is particularly adapted to be disposed in abutting engagement with the end 132, when the toe or shoe 39 is disposed upon the ground G. For purposes of illustration, and to facilitate an understanding of the present invention, the end 132 and projection 134 are, however, shown in spaced relation with respect to one another. It is to be understood, in accordance with this construction, that the projection 134 comprises an abutment or stop means for the end 132 of the arm 130.

A power control shaft 136 is disposed in underlying relationship with respect to the sickle guard 12, at a predetermined distance therebelow, and extends generally in parallel relationship therewith. The shaft 136 is similar to the power control shaft 60 of the embodiment illustrated in FIGURE 2, and, therefore, further description thereof, its particular operation, and the component parts operable thereby, is not deemed necessary. A generally horizontally extending actuating lever 138 is adjustably structurally associated with or connected to the shaft 136, as by means of the generally U-shaped or configured clamp or bolt 62, which lever comprises a forwardly disposed end 140 particularly adapted to be mutually cooperatively engageable with the end 132 of the arm 130, for rotational movement thereby. It is to be understood that, when the toe or shoe 39 of the fingers 26 is positioned upon the ground G, the end 140 is disposed in underlying relationship with respect to the end 132 and is spaced therefrom, providing, in accordance with this construction and this particular disposition of parts, a lost-motion therebetween.

In accordance with this particular construction, it can be seen that, first of all, as pointed out above, pivotal movement of the fingers 26 in a generally counter-clockwise direction is limited by the mutual cooperative engagement between the housing 42 and the lug 126. Secondly, there is a slight spacing between the housing and this lug, enabling the fingers 26 to enter depressions within the ground G. The lug 126, as is considered readily apparent, determines the lowest rotatable position of the fingers 26 relative to the sickle guard 12. Thirdly, and of primary significance, is the lost-motion relationship between the end 132 and the end 140, this particular relationship enabling any one or more of the fingers 26 to actuate the actuating lever 138, while yet precluding displacement of the inoperative fingers by the actuating lever itself.

The operation of this embodiment is generally the same as the embodiment illustrated in FIGURE 2. Again, it is to be assumed that the control shaft 136 (similar to the control shaft 60 of FIGURE 2) is particularly adapted to operate suitable control means (not shown), comprising suitable valving means (not shown), in turn controlling suitable power means (not shown), for varying the height of the sickle guard foundation assembly 10 relative to the ground G, precluding any damage thereto and to the harvesting machinery with which the same is structurally associated, all as described above. Additionally, it is to be assumed that the control shaft 136 is maintained in an inoperative or non-actuating position, as illustrated in FIGURE 3, by suitable return means (not shown), the same comprising, for example, a spring. Still further, it is to be assumed that the positioning block 106 has been adjusted longitudinally of the arm 90 to selectively dispose the tapered end 56 of the sickle guard 12 in a desired one of the apertures 116. Alternatively, it can be assumed that the position of the block has been reversed relative to the arm 90 and the end 56 selectively disposed in one of the apertures 114. In either case, the result is the desired height relationship between the arm 90 and the sickle guard 12 is attained and, accordingly, the desired height relationship between the arm 90 and the sickle guard 12 is achieved and, accordingly, the desired height relationship between the toe or shoe 39 of the fingers 26 and the ground G is effected. This particular relationship is facilitated, as pointed out above, by the pivotal movement of the end 92 of the arm 90 provided for by the arcuately configured surfaces 96 and 98 and the tapered bore 100, the latter, in turn, providing for generally pivotal movement between it and the fastener 22. Once the particular height relationship has been determined between the fingers 26 and the guard 12, the lowermost position of the former relative to the latter, as pointed out above, is determined by the engagement between the housing 42 and the lug 126 as the fingers rotate in a generally counter-clockwise direction about the enlarged annular end 94 of the arm 90.

As in the embodiment illustrated in FIGURE 2, the harvesting machinery moves generally to the left, as viewed in FIGURE 3, with the fingers 26 being particularly adapted to properly separate, distribute and dispose crops lying close to the ground G, by means of the knives 40, for severance therefrom in the conventional manner. Any proturberances rising generally vertically upwardly from the ground G will be contacted by the fingers 26, the latter thence being rotatably moved thereby in a generally clockwise direction. This pivotal movement occurs against the bias of the spring 122, and causes the resilient arm 128 to pivotally move in the same direction, bringing the end 132 thereof into juxtaposition relative to the end 140 of the actuating lever 138. If the protuberance is a gentle one, then the lost-motion relationship, or the distance between the ends 132 and 140 will be sufficiently large to preclude engagement between these ends. As a result, the lever 138 will not be actuated and the sickle guard foundation assembly will remain generally in the position illustrated in the drawing. However, should the ground protuberance be sufficiently vertically great, then the finger 26 engaged thereby will rotate generally counter-clockwise to an extent bringing the ends 132 of the arm 128 into mutual cooperative engagement with the end 140 of the actuating lever 138. The actuating lever will be rotatably moved in the same direction as the finger 26 causing its actuation, resulting in rotational movement of the control shaft 136 and actuation of the control system controlled thereby. Finally, the control system, described above, will raise the sickle guard foundation assembly 10 to preclude damage thereto by the ground protuberance, until such time as the protuberance passes beneath the shoe 39. Thence, the finger 26 will return to its initial ground engaging position under the influence of the spring 122, and even under the influence of gravity, the control shaft 136 will be returned to its initial position as illustrated in the drawing by a return means (not shown), and the assembly 10 will move generally vertically downwardly to its initial position, also illustrated generally in the drawing. This initial position, as pointed out above, disposes the end 132 of the arm 128 in mutual cooperative engagement with the projection 134 extending generally vertically downwardly from the sickle guard 12. In this particular position, the housing 42 is spaced from the lug 126, as pointed out above, to permit the fingers 26 to enter depressions in the ground G. However, when the fingers 26 enter depressions in the ground, the fingers can rotatably move no further in a counter-clockwise direction than the amount provided for by the lug.

In accordance with the above and the following constructions, it will be noted that in each embodiment, the fingers 26 are disposed in advance of the sickle guard foundation assembly 10 to preclude damage thereto. Further, it is to be noted that in each embodiment, actuation of the actuating lever 64 in FIGURE 2 and 138 in FIGURE 3 requires only the simplest mechanical movement: little more than a generally horizontal movement in the former, and simply a vertical movement in the latter. This provides for extreme ease, reliability and durability of operation. In both instances thus far described, a further result of necessitating the use of only the simplest of mechanical movements is that much less vertical space for component parts is required, enabling the harvesting machinery with which the fingers 26 are structurally associated to unusually efficiently sever even those crops lying close to the ground G.

A still further embodiment of providing for vertical adjustment of the fingers 26 relative to the sickle guard 12 and, therefore, determining the initial vertical disposition of the fingers 26 relative to the ground G, is illustrated in FIGURE 4. The embodiment illustrated in this figure is basically similar to that of FIGURE 2. However, in lieu of the apertures 50 and other related component parts, a generally U-shaped or configured abutment 150 is adjustably connected to the housing 42 by means of a conventional fastener 152. The fastener is particularly adapted to be received in a slot 154, extending through the abutment, and adjustable longitudinally dimensionally thereof, enabling the vertical disposition of the abutment relative to the housing 42 of the fingers 26 to be varied. The abutment 150 comprises, further, a plurality of generally horizontally extending legs 156, one of which, and as illustrated in FIGURE 4, the upper one is particularly adapted to be abuttingly mutually cooperatively engageable with a projection 158. The projection is integral with the arm 24, and extends generally outwardly and angularly vertically upwardly therefrom.

In accordance with this construction, it can be seen that, by virtue of the counter-clockwise force developed by the spring 28, the leg 156 will be maintained in abutting mutual cooperative engagement with the projection 158, thus determining the height relationship between the fingers 26 and the sickle guard 12, and, accordingly, the vertical disposition of the fingers relative to the ground G. If it is desired to vary this relationship, it is necessary merely to release the fastener 152 and move the abutment 150 generally vertically upwardly or downwardly relative thereto. If the abutment 150 is moved downwardly, the vertical disposition of the fingers 26 relative to the sickle guard 12 and the ground will be increased. If the converse adjustment is made, then the vertical disposition will be decreased. The operation of this embodiment in all other respects is the same as that described above with regard to the embodiment illustrated in FIGURE 2.

While the invention has been shown, illustrated, described and disclosed in terms of embodiments or modifications which it has assumed in practice, the scope of the invention should not be deemed to be limited by the precise embodiments or modifications herein shown, illustrated, described or disclosed, such other embodiments or modifications intended to be reserved especially as they fall within the scope of the claims here appended.

What is claimed is:
1. In combination with crop harvesting machinery comprising:
sickle bar foundation assembly, said assembly comprising,
a tapered sickle guard having:
a pointed forwardly disposed end, and
a channel extending generally longitudinally thereof;
a sickle bar disposed within said channel for longitudinal reciprocal movements therewithin;
sensing means for properly separating, disposing and distributing crops lying close to a ground surface while simultaneously automatically sensing generally abrupt substantially vertical variations or irregularities therein, said sensing means comprising,
a plurality of fingers extending generally forwardly of said sickle guard and operable independently and distinct of one another, said fingers having
an upper leg and a curvilinear lower leg convexly disposed relative to said upper leg;
said legs being of greater longitudinal dimensional extent than the transverse dimensional extent thereof and being disposed in acute angular relationship with respect to one another;
said legs defining a generally irregularly configured triangle having
a shoe disposed at the apex thereof, said shoe being so constituted and arranged as to define
a relatively narrow blade;
said blade being particularly adapted to the proper separation, distribution and positioning of crops lying close to the ground surface for the efficient severance therefrom;
said shoe being particularly adapted to preclude said sensing means from digging into the ground;
a bridging leg disposed generally at right angles relative to said upper leg and extending therefrom to said lower leg;
said bridging leg defining a rearwardly disposed portion on each of said upper and lower legs;
the rearwardly disposed portion of each of said upper and lower legs and said bridging leg defining
a channel housing opening and extending generally rearwardly of said fingers;
pivotal means fixedly structurally associated with said sickle bar foundation assembly for pivotally structurally associating said sensing means therewith, said pivotal means comprising,
a plurality of curvilinearly configured bracket arms fixedly structurally associated with said sickle guard and extending generally forwardly thereof into the channel housing of said sensing means;
biasing means disposed within said channel housing and structurally operatively associated with each of said bracket arms and a corresponding one of the fingers of said sensing means for biasing said fingers in one of a plurality of rotational directions relative to said bracket arms, said biasing means comprising,
a coil spring having
a plurality of ends;
a stop positioned upon the upper leg of said fingers and extending into the channel housing thereof;
one end of said spring being particularly adapted to abuttingly mutually cooperatively engage said stop;
a stop surface positioned upon said bracket arms;
another end of said spring being particularly adapted to abuttingly mutually cooperatively engage said stop surface;
first positioning means for generally arcuately vertically variably positioning said sensing means relative to said sickle guard, and, accordingly, relative to the ground surface, said first positioning means having
a plurality of apertures extending through said channel housing, and
an abutment selectively adjustably positioned within one of said plurality of apertures;
the forwardly disposed pointed end of said sickle guard being particularly adapted to be disposed within said channel housing with an upper surface thereof in abutting mutual cooperative engagement with the abutment of said first positioning means;
said biasing means being particularly adapted to maintain said sickle guard in said abutting relationship with respect to the abutment of said first positioning means for, enabling the vertical relationship between said sensing means and said sickle guard to be varied by the selective adjustment of said abutment within a desired one of said plurality of apertures and the abutting mutual cooperative engagement between said sickle guard and said abutment;

second positioning means for generally linearly vertically variably positioning and controlling the vertical position of said sickle bar foundation assembly relative to the ground surface to compensate for and conform with generally abrupt substantially vertical irregularities therein, said second positioning means comprising, a power control shaft disposed in underlying relationship with respect to said foundation assembly, and an actuating lever structurally associated with said shaft;

said actuating lever having an aperture extending through an upper end portion thereof;

said shaft being particularly adapted to be rotatably actuated by said actuating lever for the actuation of a power control system particularly adapted to vertically variably position said foundation assembly relative to the ground surface; and adjustable lost-motion means for rotatably actuating said actuating lever when said sensing means responds to generally abrupt substantially vertical variations in the ground surface, said lost-motion means having a plurality of spaced generally horizontally aligned apertures extending through the rearwardly disposed portion of said lower leg, a securing bolt selectively adjustably positioned within and extending through one of said plurality of apertures, biasing means adjustably fixedly and rotatably positioned upon and with respect to said securing bolt, said biasing means comprising, a helical coil spring, a longitudinally dimensionally extensive loop having:

a lower rod particularly adapted to extend through said aperture, and a bight end disposed in a predetermined spaced rearwardly disposed relationship with respect to the apertured end of said actuating lever, enabling the presentation of a sufficient lost-motion relationship therebetween to maintain the actuating lever and the power control system mediately actuatable thereby in an inoperative position when the sensing means responds to gentle substantially vertical irregularities in the ground surface, and enabling the actuation of said actuating lever by the mutual cooperative engagement between the bight end and the apertured end of said lever when said sensing means responds to generally abrupt substantially vertical irregularities in the ground surface.

2. In combination with crop harvesting machinery comprising:

sickle bar foundation assembly;

sensing means for properly separating, disposing and distributing crops lying close to a ground surface and simultaneously automatically sensing generally abrupt substantially vertical variations or irregularities therein, said sensing means comprising, a plurality of fingers;

said fingers being so constituted and arranged as to be operable independently and distinct of one another;

means operatively connected with said foundation assembly for generally arcuately vertically variably positioning said sensing means relative to said sickle bar foundation assembly and, accordingly, relative to the ground surface;

second means operatively connected with said foundation assembly for generally vertically variably positioning and controlling the vertical position of said sickle bar foundation assembly relative to the ground surface to compensate for and conform with generally abrupt substantially vertical irregularities therein; and adjustable lost-motion means operatively engageable between said fingers and said second means for actuating said second positioning means when said sensing means responds to generally abrupt substantially vertical variations in the ground surface;

said lost-motion means comprising an element normally out of operative engagement with said second means when said sensing means engages a relatively smooth ground surface or a gentle irregularity therein and mounted for movement into operative engagement with said second means when said sensing means engages an abrupt substantially vertical irregularity in the ground surface, said lost-motion means being so constituted and arranged as to enable the presentation of a sufficient lost-motion relationship between the same and said second vertical positioning means to maintain the latter in an inoperative position when the sensing means responds to gentle substantially vertical irregularities in the ground surface, and enabling the actuation of said second vertical positioning means when the sensing means responds to generally abrupt substantially vertical irregularities in the ground surface.

3. In the combination as defined in claim 2, wherein:

said sensing means comprises, a channel housing opening and extending generally rearwardly of said fingers; and said means for generally arcuately vertically variably positioning said sensing means comprises, a selectively adjustable abutment extending to within said channel housing;

said foundation assembly extending to within said housing and being generally vertically adjustably abuttingly mutually cooperatively engageable with said abutment.

4. In the combination as defined in claim 3, wherein:

said second means for generally vertically variably controlling the foundation assembly comprises, an apertured actuating lever disposed in underlying relationship with respect to said assembly; and said adjustable lost-motion means comprises, a loop extending through said apertured lever having a bight end disposed in a predetermined spaced rearwardly disposed relationship with respect thereto.

5. In combination with crop harvesting machinery comprising:

a sickle bar foundation assembly;

sensing means for properly separating, disposing and distributing crops lying close to a ground surface and simultaneously automatically sensing generally abrupt substantially vertical variations or irregularities therein, said sensing means comprising, a plurality of fingers, said fingers being so constituted and arranged as to be operable independently and distinct of one another; and a channel housing opening and extending generally rearwardly of said fingers;

means for generally arcuately vertically variably positioning said sensing means relative to said sickle bar foundation assembly and, accordingly, relative to the ground surface, said means comprising, a selectively adjustable abutment extending to within said channel housing, said sickle bar foundation assembly extending to within said housing and being generally vertically adjustably abuttingly mutually cooperatively engageable with said abutment, means for generally linearly vertically variably positioning and controlling the vertical position of said sickle bar foundation assembly relative to the ground to compensate for and conform with generally abrupt substantially vertical irregularities therein, said last-named means comprising, an apertured actuating lever disposed in underlying relationship with respect to said sickle bar foundation assembly; and adjustable lost-motion means for actuating said lever when said sensing means responds only to generally abrupt substantially vertical variations in the ground surface, said lost-motion means comprising, a loop extending through said apertured lever having a bight end disposed in a predetermined spaced rearwardly disposed relationship with respect thereto, enabling the presentation of a sufficient lost-motion relationship between the same and said linear vertical positioning means to maintain the latter in an inoperative position when the sensing means responds to gentle substantially vertical irregularities in the ground surface, and enabling the actuation of said vertical positioning means when the sensing means responds to generally abrupt substantially vertical irregularities in the ground surface.

6. Ground sensing apparatus particularly adapted for use with crop harvesting machinery comprising, in combination:

a foundation assembly;

sensing means for properly separating, disposing and distributing crops lying close to a ground surface and simultaneously automatically sensing generally abrupt substantially vertical variations or irregularities therein, said sensing means comprising, a plurality of fingers;

said fingers being so constituted and arranged as to be operable independently and distinct of one another;

means operatively connected with said foundation assembly for generally arcuately vertically variably positioning said sensing means relative to said ground surface;

second means operatively connected with said foundation assembly for generally vertically variably positioning said sensing means relative to the ground surface to compensate for and conform with generally abrupt substantially vertical irregularities therein; and adjustable lost-motion means for actuating said second positioning means when said sensing means responds to generally abrupt substantially vertical variations in the ground surface;

said lost-motion means comprising an element normally out of operative engagement with said second means when said sensing means engages a relatively smooth ground surface or a gentle irregularity therein and mounted for movement into operative engagement with said second means when said sensing means engages an abrupt substantially vertical irregularity in the ground surface;

said lost-motion means being so constituted and arranged as to enable the presentation of a sufficient lost-motion relationship between the same and said second vertical positioning means to maintain the latter in an inoperative position when the sensing means responds to gentle substantially vertical irregularities in the ground surface, and enabling the actuation of said second vertical positioning means when the sensing means responds to generally abrupt substantially vertical irregularities in the ground surface.

7. Ground sensing apparatus as defined in claim 6, wherein:

said sensing means comprises, a channel housing opening and extending generally rearwardly of said fingers; and said means for generally arcuately vertically variably positioning said sensing means comprises, a selectively adjustable abutment extending to within said channel housing;

said foundation assembly extending to within said housing and being generally vertically adjustably abuttingly mutually cooperatively engageable with said abutment.

8. Ground sensing apparatus as defined in claim 6, wherein:

said second means for generally vertically variably controlling the foundation assembly comprises, an apertured actuating lever disposed in underlying relationship with respect to said assembly; and said adjustable lost-motion means comprises, a loop extending through said apertured lever having a bight end disposed in a predetermined spaced rearwardly disposed relationship with respect thereto.

9. Ground sensing apparatus particularly adapted for use with crop harvesting machinery comprising, in combination:

sensing means for properly separating, disposing and distributing crops lying close to a ground surface and simultaneously automatically sensing generally abrupt substantially vertical variations or irregularities therein, said sensing means comprising, a plurality of fingers;

said fingers being so constituted and arranged as to be operable independently and distinct of one another; and a channel housing opening and extending generally rearwardly of said fingers;

means for generally arcuately vertically variably positioning said sensing means relative to said ground surface, said means comprising, a selectively adjustable abutment extending to within said channel housing;

said abutment being particularly adapted to be generally vertically adjustably abuttingly mutually cooperatively engageable with a sickle guard;

means for generally linearly vertically variably positioning said sensing means relative to the ground surface to compensate for and conform with generally abrupt substantially vertical irregularities therein, said last-named means comprising, an apertured actuating lever particularly adapted to be disposed in underlying relationship with respect to said sickle guard; and adjustable lost-motion means for actuating said linear positioning means when said sensing means responds only to generally abrupt substantially vertical variations in the ground, said lost-motion means comprising, a loop extending through said apertured lever having a bight end disposed in a predetermined spaced rearwardly disposed relationship with respect thereto, enabling the presentation of a sufficient lost-motion relationship between the same and said linear vertical positioning means to maintain the latter in an inoperative position when the sensing means responds to gentle substantially vertical irregularities in the ground surface, and enabling the actuation of said linear vertical positioning means when the sensing means responds to generally abrupt substantially vertical irregularities in the ground surface.

10. In combination with crop harvesting machinery comprising:

a sickle bar foundation assembly;

sensing means for properly separating, disposing and distributing crops lying close to a ground surface and simultaneously automatically sensing generally abrupt substantially vertical variations or irregularities therein, said sensing means comprising, a plurality of fingers;

said fingers being so constituted and arranged as to be operable independently and distinct of one another; and a channel housing opening and extending generally rearwardly of said fingers;

means mounting said fingers on said foundation assembly for generally arcuately vertically variable movement relative to said sickle bar foundation assembly and, accordingly, relative to the ground surface, said means comprising, in turn, a supporting arm mounted on said foundation assembly for pivotal movement about a generally transversely extending axis, an adjustable positioning block reversibly structurally associated upon and with respect to said arm;

said foundation assembly extending to within said housing and being generally vertically adjustably insertably mutually cooperatively engageable with said positioning block; and a lug positioned upon said arm and extending therefrom to be abuttingly mutually cooperatively engageable with said housing;

said lug being spaced from said housing when said sensing means rests upon the ground surface, enabling the sensing means to closely realize the contour thereof;

means operatively connected with said foundation assembly for generally linearly vertically variably positioning and controlling the vertical position of said sickle bar foundation assembly relative to the ground surface to compensate for and conform with generally abrupt substantially vertical irregularities therein, said last-named means comprising, an actuating lever disposed in underlying relationship with respect to said assembly; and an adjustable lost-motion means comprising a resilient arm carried by said sensing means and disposed in spaced relationship with respect to said actuating lever and being particularly adapted to be abuttingly mutually cooperatively engageable with said foundation assembly when said sensing means is positioned to rest upon the ground;

the spaced relationship between the arm and the lever enabling the presentation of a sufficient lost-motion relationship therebetween to maintain the linear vertical positioning means in an inoperative position when the sensing means responds to gentle substantially vertical irregularities in the ground surface, and enabling the actuation of said vertical positioning means when the sensing means responds to generally abrupt substantially vertical irregularities in the ground surface.

11. In the combination as defined in claim 2, wherein:
said sensing means comprises,
a channel housing opening and extending generally rearwardly of said fingers; and
said means for generally arcuately vertically variably positioning said sensing means comprises,
an abutment structurally operatively associated with said housing;
said abutment being particularly adapted to be adjustably movable in each of a plurality of directions relative to said housing; and
a projection particularly adapted to be abuttingly mutually cooperatively engageable with said abutment.

12. In the combination as defined in claim 11, wherein:
said abutment is generally of U-shaped configuration having
a plurality of legs; and
said projection is particularly adapted to be abuttingly mutually cooperatively engageable with one of said legs.

13. In combination with crop harvesting machinery comprising:
a sickle bar foundation assembly;
sensing means for properly separating, disposing and distributing crops lying close to a ground surface while simultaneously automatically sensing generally abrupt substantially vertical variations or irregularities therein,
said sensing means comprising,
at least one finger so constituted and arranged as to be operable independently and distinct of one another, and
a channel housing opening and extending generally away from said finger;
means for generally arcuately vertically variably positioning said sensing means relative to said sickle bar foundation assembly and, accordingly, relative to the ground surface,
said arcuately vertically positioning means comprising
a supporting arm having
a forwardly disposed end portion extending to within the housing and structurally associated therewith, and
a rearwardly disposed end portion of arcuate configuration pivotally structurally associated upon and with respect to said foundation assembly,
an adjustable positioning block reversibly structurally associated upon and with respect to said supporting arm, said adjusting block comprising,
a plurality of surfaces disposed in angular relationship with respect to one another, each of said surfaces having longitudinally spaced apertures extending therethrough; the spacing of the apertures being different than that of the apertures extending through the other of said surfaces;
said foundation assembly extending to within said housing and being generally vertically adjustably insertably mutually cooperatively engageable within a selectively desirable one of said apertures; and
a lug positioned upon said supporting arm and extending therefrom in abuttingly mutually cooperatively engageable relationship with said housing, said lug being spaced from said housing when said sensing means rests upon the ground surface for enabling the sensing means to closely realize the contour thereof;
means for generally linearly vertically variably positioning and controlling the vertical position of said sickle bar foundation assembly relative to the ground surface to compensate for and conform with generally abrupt substantially vertical irregularities therein; and
adjustable lost-motion means for actuating said linear positioning means when said sensing means responds to generally abrupt substantially vertical variations in the ground surface, said lost-motion means being so constituted and arranged as to enable the presentation of a sufficient lost-motion relationship between the same and said linear vertical positioning means to maintain the latter in an inoperative position when the sensing means responds to gentle substantially vertical irregularities in the ground surface and for enabling the actuation of said linear vertical positioning means when the sensing means responds to generally abrupt substantially vertical irregularities in the ground surface.

14. In the combination as defined in claim 13, wherein:
said means for generally linearly vertically variably controlling the foundation assembly comprises,
an actuating lever disposed in underlying relationship with respect to said assembly; and
said adjustable lost-motion means comprises,
a resilient arm having
an end portion disposed in overlying relationship with respect to said actuating lever and in underlying relationship with respect to said foundation assembly, and
a projection extending from said foundation assembly and being particularly adapted to be abuttingly mutually cooperatively engageable with said end portion when said sensing means is positioned to rest upon the ground surface;
said end portion being in spaced overlying relationship with respect to said actuating lever, enabling the presentation of a sufficient lost-motion relationship between the same and said linear vertical positioning means.

15. In combination with crop harvesting machinery comprising:
   a sickle bar foundation assembly;
   sensing means for properly separating, disposing and distributing crops lying close to a ground surface and simultaneously automatically sensing generally abrupt substantially vertical variations or irregularities therein, said sensing means comprising,
   at least one elongate finger so constituted and arranged as to be operable independently and distinct of one another; and
   a channel housing opening and extending generally rearwardly of said finger;
   means for generally arcuately vertically variably positioning said sensing means relative to said sickle bar foundation assembly and, accordingly, relative to the ground surface, said means for arcuately vertically positioning said sensing means comprising:
   a supporting arm,
   an adjustable positioning block reversibly structurally associated upon and with respect to said supporting arm;
   said foundation assembly extending to within said housing and being generally vertically adjustably insertably mutually cooperatively engageable with said positioning block; and
   a lug positioned upon said supporting arm and extending therefrom in abuttingly mutually cooperatively engageable relationship with said housing;
   said lug being spaced from said housing when said sensing means rests upon the ground surface for enabling the sensing means to closely realize the contour thereof;
   means for generally linearly vertically variably positioning and controlling the vertical position of said sickle bar foundation assembly relative to the ground surface to compensate for and conform with generally abrupt substantially vertical irregularities therein; and
   adjustable lost-motion means for actuating said linear positioning means when said sensing means responds only to generally abrupt substantially vertical variations in the ground surface;
   said lost-motion means being so constructed and arranged as to enable the presentation of a sufficient lost-motion relationship between the same and said linear vertical positioning means to maintain the latter in an inoperative position when the sensing means responds to gentle substantially vertical irregularities in the ground surface, and enabling the actuation of said linear vertical positioning means when the sensing means responds to generally abrupt substantially vertical irregularities in the ground surface.

16. In the combination as defined in claim 15, wherein:
   said means for generally linearly vertically variably controlling the foundation assembly comprises,
   an actuating lever disposed in underlying relationship with respect to said sickle bar foundation assembly; and
   said adjustable lost-motion means comprises,
   a resilient arm disposed in spaced relationship with respect to said actuating lever and being particularly adapted to be abuttingly mutually cooperatively engageable with said foundation assembly when said sensing means is positioned to rest upon the ground surface;
   said spaced relationship between the arm and the lever enabling the presentation of a sufficient lost-motion relationship between the same and said linear vertical positioning means.

17. In combination with crop harvesting machinery comprising:
   a sickle bar foundation assembly on the machinery;
   at least one elongate finger extending forwardly of said foundation assembly in the direction of travel of the machinery for properly separating, disposing, and distributing crops lying close to a ground surface for substantially immediate harvesting and simultaneously automatically sensing generally abrupt substantially vertical variations or irregularities in the ground surface;
   means mounting said finger on said machinery for independent generally arcuately vertically variable movement relative to said foundation assembly and, accordingly, to the ground surface;
   second means operatively connected with said foundation assembly for vertically variably positioning and controlling the vertical position of said foundation assembly relative to the ground surface to compensate for and conform with generally abrupt substantially vertical irregularities therein; and
   lost-motion means operatively engageable between said finger and said positioning means, for actuating said positioning means when said finger responds to generally abrupt substantially vertical variations in the ground surface,
   said lost-motion means being so constituted and arranged as to enable the presentation of a sufficient lost-motion relationship between the same and said second means to maintain the latter in an inoperative position when said finger responds to gentle substantially vertical irregularities in the ground surface and for enabling the actuation of said second means when said finger responds to generally abrupt substantially vertical irregularities in the ground surface.

18. The combination of claim 17 wherein said lost-motion means comprises
   an element normally out of engagement with said positioning means when said sensing means engages a relatively smooth ground surface or a gentle irregularity therein,
   said element being mounted for movement into operative engagement with said second means when said finger engages an abrupt substantially vertical irregularity in the ground surface.

References Cited by the Examiner

UNITED STATES PATENTS

| | | | |
|---|---|---|---|
| 1,797,682 | 3/1931 | Gaterman | 56—313 |
| 1,979,010 | 10/1934 | Paradise | 56—312 |
| 2,014,569 | 9/1935 | Huddle | 56—313 |
| 2,484,704 | 10/1949 | Girodat | 56—312 |
| 2,750,727 | 5/1956 | Wright | 56—208 |

ABRAHAM G. STONE, *Primary Examiner.*

RUSSELL R. KINSEY, *Examiner.*